(12) United States Patent
Tang

(10) Patent No.: US 11,343,829 B2
(45) Date of Patent: May 24, 2022

(54) MONITORING METHOD AND TERMINAL APPARATUS IN INTERNET-OF-VEHICLES SYSTEM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 38 days.

(21) Appl. No.: 16/623,575

(22) PCT Filed: Aug. 4, 2017

(86) PCT No.: PCT/CN2017/095960
§ 371 (c)(1),
(2) Date: Dec. 17, 2019

(87) PCT Pub. No.: WO2019/024072
PCT Pub. Date: Feb. 7, 2019

(65) Prior Publication Data
US 2021/0029714 A1 Jan. 28, 2021

(51) Int. Cl.
*H04W 72/08* (2009.01)
*H04W 4/40* (2018.01)
(Continued)

(52) U.S. Cl.
CPC .............. *H04W 72/08* (2013.01); *H04W 4/40* (2018.02); *H04W 72/02* (2013.01); *H04W 72/0446* (2013.01)

(58) Field of Classification Search
CPC . H04W 72/02; H04W 72/08; H04W 72/0446; H04W 4/40
See application file for complete search history.

(56) References Cited

U.S. PATENT DOCUMENTS

| 2016/0135170 | A1 | 5/2016 | Chen et al. |
| 2016/0295584 | A1 | 10/2016 | Chen et al. |

(Continued)

FOREIGN PATENT DOCUMENTS

| CN | 104936132 A | 9/2015 |
| CN | 106571901 A | 4/2017 |

(Continued)

OTHER PUBLICATIONS

Vodafone, New SID: Study on NR V2X, Approval, 3GPP TSG RAN Meeting #80 RP-181429, Jun. 11-14, 2018.

(Continued)

*Primary Examiner* — Rhonda L Murphy

(57) ABSTRACT

Provided are a monitoring method and terminal apparatus in an Internet-of-Vehicles system. The method comprises: a terminal apparatus generating instruction information on a media access control layer, the instruction information being configured to instruct the terminal apparatus to monitor, on a physical layer, at least one resource pool of one transmission duration; and the terminal apparatus sending to the physical layer the instruction information. In embodiments of the present invention, the terminal apparatus effectively improves a data transmission rate by means of selectively monitoring a resource pool (e.g., a resource pool of 1-ms TTI and a resource pool of a 0.5-ms TTI), thus reducing data transmission delay, and accordingly improving user experience.

18 Claims, 3 Drawing Sheets

(51) Int. Cl.
  *H04W 72/02* (2009.01)
  *H04W 72/04* (2009.01)

(56) References Cited

U.S. PATENT DOCUMENTS

2019/0312685 A1  10/2019  Zhou
2021/0136794 A1*  5/2021  Takeda .................. H04W 4/00

FOREIGN PATENT DOCUMENTS

| CN | 106664168 A | 5/2017 |
|---|---|---|
| EP | 3282775 A1 | 2/2018 |
| RU | 2545187 C1 | 3/2015 |
| WO | 2016179835 A1 | 11/2016 |
| WO | 2017024565 A1 | 2/2017 |
| WO | 2017041677 A1 | 3/2017 |
| WO | 2017062061 A1 | 4/2017 |

OTHER PUBLICATIONS

First Office Action of the Russian application No. 2020101933, dated Oct. 9, 2020.

Intel Corporation: "Considerations on Support of Short TTI for LTE V2V Sidelink Communication", 3GPP Draft; R1-1707307 Intel—V2X_STTI_SCHEMES, 3rd Generation Partnership Project (3GPP), Mobile Competence Centre ; 650, Route Des Lucioles ; F-06921 Sophia-Anti Polis Cedex ; France, vol. RAN WG1, No. Hangzhou; May 15, 2017-May 19, 2017 May 14, 2017 (May 14, 2017), XP051272520, Retrieved from the Internet: URL:http://www.3gpp.org/ftp/Meetings_3GPP_SYNC/RAN1/Docs/ [retrieved on May 14, 2017]*.

Zte et al: "Discussion on Short TTI with eV2X", 3GPP Draft: R1-1704655—7.2.3.3 Discussion on Short TTI With V2X, 3rd Generation Partnership Project (3GPP), Mobile Competence Centre ; 650, Route Des Lucioles ; F-06921 Sophia-Anti Polis Cedex ; FRAN, vol. RAN WG1, No. Spokane, Washington, USA; Apr. 3, 2017-Apr. 7, 2017 Mar. 24, 2017 (Mar. 24, 2017), XP051250551, Retrieved from the Internet: URL:http://www.3gpp.org/ftp/tsg_ran/WG1_RL1/TSGR1_88b/Docs/ [retrieved on Mar. 24, 2017] * the whole document * *.

Oppo: "Resource selection for sTTI in eV2x", 3GPP Draft: R2-1710149—Resource Selection for STTI in EV2X, 3rd Generation Partnership Project (3GPP) , Mobile Competence Centre ; 650, Route Des Lucioles ; F-06921 Sophia-Antipolis Cedex ; France, vol. RAN WG2 , No. Prague, Czech; Oct. 9, 2017-Oct. 13, 2017 Oct. 8, 2017 (Oct. 8, 2017) , XP051342216, Retrieved from the Internet : URL:http://www.3gpp.org/ftp/Meetings_3GPP_SYNC/RAN2/Docs/ [retrieved on Oct. 8, 2017] * the whole document * *.

Supplementary European Search Report in the European application No. 17920527.3, dated Apr. 24, 2020.

English translation of the Written Opinion of the International Search Authority in the international application No. PCT/CN2017/095960, dated May 4, 2018.

International Search Report in the international application No. PCT/CN2017/095960, dated May 4, 2018.

Written Opinion of the International Search Authority in the international application No. PCT/CN2017/095960, dated May 4, 2018.

Intel Corporation. MAC entities to support multiple NR verticals. 3GPP TSG-RAN2 Meeting #96 R2-168531, Nov. 18, 2016 (Nov. 18, 2016), pp. 1-3.

Intel Corporation. Discussion on MAC functionalities for NR. 3GPP TSG-RAN2 Meeting #94 R2-163580. May 27, 2016 (May 27, 2016), entire document.

Office Action of the Indian application No. 202017000566, dated Mar. 22, 2021.

First Office Action of the Canadian application No. 3066921, dated Feb. 12, 2021.

Written Opinion of the Singaporean application No. 11201912459W, dated Aug. 19, 2021.

First Office Action of the European application No. 17920527.3, dated Oct. 25, 2021.

Second Office Action of the Canadian application No. 3066921, dated Dec. 20, 2021.

Notice of Rejection of the Singaporean application No. 11201912459W dated Feb. 3, 2022.

* cited by examiner

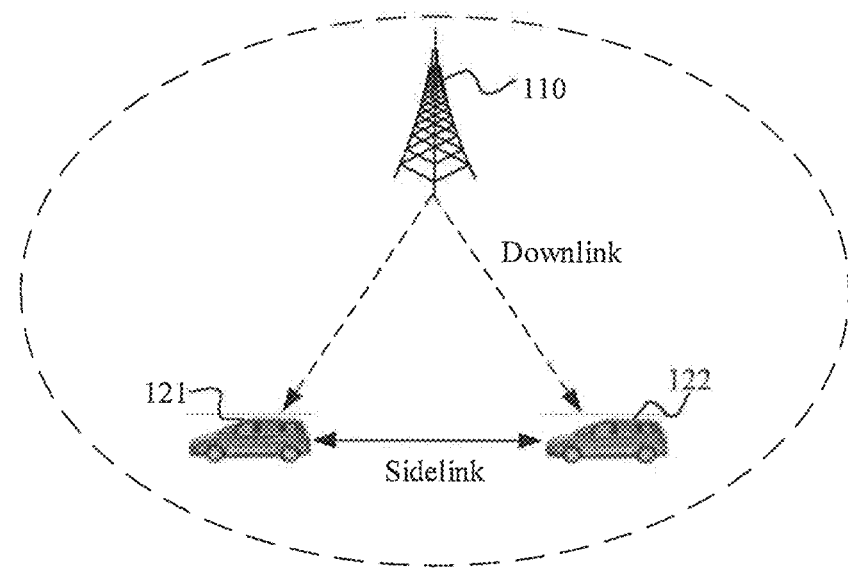
FIG. 1
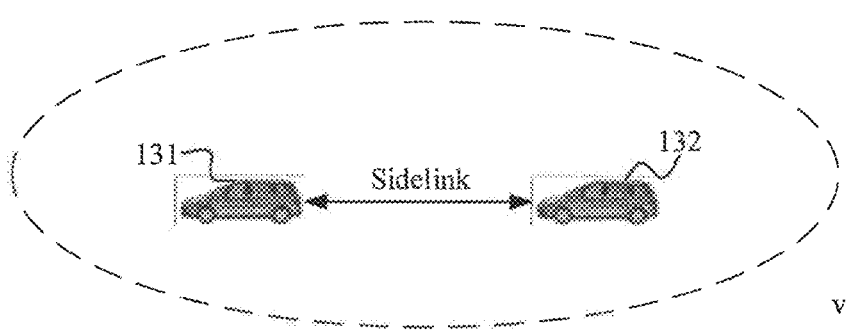
FIG. 2
| A terminal device generates indication information in a media access control layer, where the instruction information is to instruct the terminal device to sense a resource pool having resources with at least one type of TTI in a physical layer | 210 |
| The terminal transmits the indication information to the physical layer | 220 |
FIG. 3

MONITORING METHOD AND TERMINAL APPARATUS IN INTERNET-OF-VEHICLES SYSTEM

TECHNICAL FIELD

The disclosure relates to the field of communications, and more particularly to a sensing method in an internet of vehicles system and a terminal device.

BACKGROUND

Internet of vehicles is a side link (SL) transmission technology based on long term evolution vehicle to vehicle (LTE V2V). Unlike a conventional LTE system adopting a manner of receiving or transmitting communication data through a base station, an internet of vehicles system adopts a device-to-device (D2D) communication manner and thus is higher in spectrum efficiency and lower in transmission delay.

In 3rd generation partnership project (3GPP) Release 14 (Rel-14), vehicle to everything (V2X) technology was standardized, and two transmission modes had been defined: a mode 3 and a mode 4. In the mode 3, as illustrated in FIG. 1, a transmission resource for a vehicle terminal (a vehicle terminal 121 and a vehicle terminal 122) is allocated by a base station 110. The vehicle terminal performs data transmission on an SL according to the resource allocated by the base station 110. The base station 110 may allocate a resource for single transmission to the terminal and may also allocate a resource for semi-persistent transmission to the terminal. In the mode 4, as illustrated in FIG. 2, a transmission manner combining sensing and reservation is adopted for a vehicle terminal (a vehicle terminal 131 and a vehicle terminal 132). The vehicle terminal acquires a set of available transmission resources from a resource pool in a sensing manner, and the terminal randomly selects a resource from the set for data transmission.

However, in the related technology, in the mode 4, a vehicle terminal usually senses a resource pool having resources with a long transmission time interval (TTI) only, for example, a 1 ms resource pool. As a result, a data transmission delay is excessively long, thereby reducing user experience.

SUMMARY

A sensing method in an internet of vehicles system and a terminal device are provided, which may effectively reduce a data transmission delay, thereby improving user experience.

A first aspect provides a sensing method in an internet of vehicles system, which includes the following operations.

A terminal device generates indication information in a media access control layer, where the indication information is to instruct the terminal device to sense a resource pool having resources with at least one type of TTI in a physical layer.

The terminal device transmits the indication information to the physical layer.

In the implementations of the disclosure, the terminal device selectively senses the resource pool (for example, a resource pool having resources with a 1 ms TTI and a resource pool having resources with a 0.5 ms TTI), so that a data transmission delay may be effectively reduced, and data transmission efficiency may be improved, thereby improving user experience.

In some possible implementations, before the operation that the terminal device generates the indication information in the media access control layer, the method may further include the following operation.

The terminal device acquires correspondence relationship information in the media access control layer, where the correspondence relationship information includes correspondences between logical channels for transmitting data to be transmitted and the at least one type of TTI supported by the logical channels. The operation that the terminal device generates the indication information in the media access control layer may include the following operation.

The terminal device generates the indication information in the media access control layer according to the correspondence relationship information.

In some possible implementations, the method may further include the following operations.

The terminal device senses the resource pool having resources with the at least one type of TTI to acquire a transmission resource set of available transmission resources in the physical layer; the terminal device generates a sensing result report in the physical layer according to the transmission resource set; and the terminal device transmits the sensing result report to the media access control layer.

In some possible implementations, the sensing result report may include the transmission resource set.

In some possible implementations, the method may further include the following operations.

The terminal device receives the sensing result report in the media access control layer, where the sensing result report includes the transmission resource set; the terminal device selects a first resource from the transmission resource set in the media access control layer; and the terminal device transmits the data to be transmitted on the first resource.

In some possible implementations, the operation that the terminal device generates the sensing result report in the physical layer according to the transmission resource set may include the following operations.

The terminal device selects at least one resource from the transmission resource set in the physical layer; and the terminal device generates the sensing result report in the physical layer, where the sensing result report includes the at least one resource.

In some possible implementations, before the operation that the terminal device selects the at least one resource from the transmission resource set in the physical layer, the method may further include the following operation.

The terminal device acquires information about channel quality corresponding to each resource in the transmission resource set in the physical layer. The operation that the terminal device selects the at least one resource from the transmission resource set in the physical layer may include the following operation.

The terminal device selects, based on the information about the channel quality corresponding to each resource in the transmission resource set, the at least one resource from the transmission resource set in a descending order of channel quality in the physical layer.

In some possible implementations, the operation that the terminal device selects the at least one resource from the transmission resource set in the physical layer may include the following operations.

In a case that the transmission resource set includes resources with a plurality of types of TTIs, the terminal device selects a resource with a first type of TTI from the resources with the plurality of types of TTIs in the physical layer; and the terminal device determines the resource with the first type of TTI as the at least one resource in the physical layer.

Accordingly, the data to be transmitted may be effectively matched with a resource type of the TTI, and the user experience is further improved. For example, for a service with a relatively high delay requirement, a resource of a short TTI may be used.

In some possible implementations, before the operation that the terminal device selects the resource with the first type of TTI from the resources with the plurality of types of TTIs in the physical layer, the method may further include the following operation.

The terminal device acquires information about channel quality corresponding to each resource with a respective type of TTI in the plurality of types of TTIs in the physical layer. The operation that the resource with the first type of TTI is selected from the resources with the plurality of types of TTIs may include the following operation.

The terminal device selects, based on the information about the channel quality corresponding to each resource with the respective type of TTI in the plurality of types of TTIs, the resource with the first type of TTI from the resources with the plurality of types of TTIs in the physical layer.

In some possible implementations, the method may further include the following operations.

The terminal device receives the sensing result report in the media access control layer, where the sensing result report includes the at least one resource; the terminal device selects a first resource from the at least one resource in the media access control layer; and the terminal device transmits the data to be transmitted on the first resource.

In some possible implementations, the operation that the terminal device selects the first resource from the at least one resource in the media access control layer may include the following operation.

The terminal device randomly selects the first resource from the at least one resource in the media access control layer.

In some possible implementations, the operation that the terminal device selects the first resource from the at least one resource in the media access control layer may include the following operation.

The terminal device selects the first resource from the at least one resource in a descending order of channel quality in the media access control layer.

In some possible implementations, resources in the sensing result report may be ranked in a descending or ascending order of channel quality.

In some possible implementations, the sensing result report may further include information about channel quality corresponding to each resource in the sensing result report, where the information about the channel quality may include at least one piece of the following information: a receive signal strength indicator (RSSI), a reference signal receiving power (RSRP), or a reference signal receiving quality (RSRQ); or the sensing result report may further include information about channel quality corresponding to each resource with a respective type of TTI in the sensing result report.

In some possible implementations, the at least one TTI may include at least one of a first type of TTI or a second type of TTI, and a length of the first type of TTI may be greater than a length of the second type of TTI.

In some possible implementations, the length of the first type of TTI may be 1 ms, and the length of the second type of TTI may be 0.5 ms.

A second aspect provides a terminal device, which includes a generation unit and a transceiver unit.

The generation unit is arranged to generate indication information in a media access control layer, where the indication information is to instruct the terminal device to sense a resource pool having resources with at least one type of TTI in a physical layer.

The transceiver unit may be arranged to transmit the indication information to the physical layer.

A third aspect provides a terminal device, which includes a processor and a transceiver.

The processor is arranged to generate indication information in a media access control layer, where the indication information is to instruct the terminal device to sense a resource pool having resources with at least one type of TTI in a physical layer.

The transceiver is arranged to transmit the indication information to the physical layer.

A fourth aspect provides a computer-readable medium, which is used to store a computer program, the computer program including instructions for executing the method implementation according to the first aspect.

A fifth aspect provides a computer chip, which includes an input interface, an output interface, at least one processor and a memory. The processor is arranged to execute a code in the memory, and when the code is executed, the processor may implement each process executed by a terminal device in a sending method in an internet of vehicles system according to the first aspect and each implementation.

A sixth aspect provides a communication system, which includes multiple abovementioned terminal devices.

BRIEF DESCRIPTION OF DRAWINGS

FIG. 1 illustrates a schematic block diagram of a transmission mode according to an implementation of the disclosure.

FIG. 2 illustrates a schematic block diagram of another transmission mode according to an implementation of the disclosure.

FIG. 3 illustrates a schematic flowchart of a method for sensing a resource pool according to an implementation of the disclosure.

DETAILED DESCRIPTION

Figure 4:
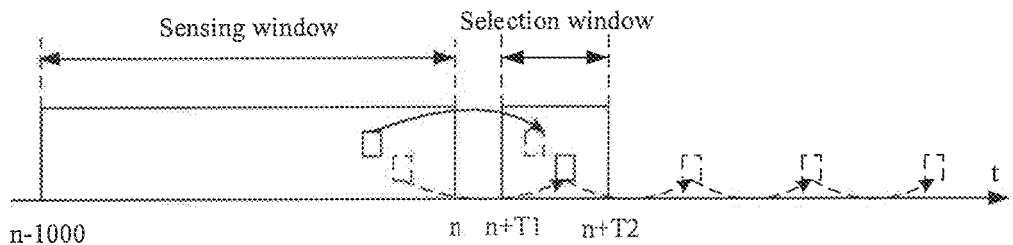
FIG. 4 illustrates a schematic flowchart of a sensing method in an internet of vehicles system according to an implementation of the disclosure.

The technical solutions in the implementations of the disclosure will be described below in combination with the drawings.

The implementations of the disclosure may be applied to any terminal device-to-terminal device communication architecture, for example, V2V, V2X and D2D. A vehicle terminal-to-vehicle terminal system framework illustrated in FIG. 2 is only an example of the implementations of the disclosure and the implementations of the disclosure are not limited thereto.

A terminal device in the implementations of the disclosure may be any device or apparatus configured with a physical layer and a media access control layer. The terminal device may also be called an access terminal, such as, user equipment (UE), a user unit, a user station, a mobile radio station, a mobile station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), a handheld device with a wireless communication function, a computing device or another linear processing device connected to a wireless modem, a vehicle device, a wearable device and the like. Descriptions are made with a vehicle terminal as an example, but the implementations of the disclosure are not limited thereto.

In the implementations of the disclosure, when the terminal device senses a resource pool, a resource pool with a short TTI is introduced based on a conventional resource pool with a long TTI. According to a sensing method of the implementations of the disclosure, when the terminal device is required to select a resource and when there are both a resource pool with a short TTI and a resource pool with a long TTI, the terminal device may selectively sense the resource pools.

How the terminal device selectively senses the resource pools will be introduced below.

FIG. 3 illustrates a schematic flowchart of a method for sensing a resource pool by a terminal device according to an implementation of the disclosure.

As illustrated in FIG. 3, the method includes the following operations.

At block 210, the terminal device generates indication information in a media access control layer. The indication information is to instruct the terminal device to sense a resource pool having resources with at least one type of TTI in a physical layer.

At block 220, the terminal device transmits the indication information to the physical layer.

There is made such a hypothesis that the at least one type of TTI in the implementation of the disclosure may include at least one of a first type of TTI (a long TTI) or a second type of TTI (a short TTI), and a length of the first type of TTI (the long TTI) is greater than a length of the second type of TTI (the short TTI).

When the terminal device is required to select a resource, in a case that there are both a resource pool with the long TTI and a resource pool with the short TTI, or the resource pool includes both a resource with the short TTI and a resource with the long TTI, the terminal device may selectively sense the resource pools. For example, the terminal device may select to sense the resource pool with the long TTI. For another example, the terminal device may select to sense the resource pool with the short TTI. For another example, the terminal device may select to sense both the resource pool with the long TTI and the resource pool with the short TTI.

For example, the long TTI may be a ms T, and the short TTI may be a 0.5 ms TTI. However, a type of the TTI in the implementation of the disclosure is not limited thereto. For example, the at least one type of TTI may further include a third type of TTI, for example, a 2 ms TTI.

For convenient understanding, exemplary descriptions will be made below with the condition that the at least one type of TTI includes two types of TTIs, i.e., the long TTI and the short TTI, as an example.

Optionally, before generating the indication information in the media access control layer, the terminal device acquires correspondence relationship information in the media access control layer. The correspondence relationship information includes correspondences between logical channels for transmitting data to be transmitted and the at least one TTI supported by the logical channels. Then, the terminal device generates the indication information in the media access control layer according to the correspondence relationship information.

When the terminal device is required to select the resource, the terminal device may check each logical channel with data to be transmitted in the media access control layer. If each logical channel has a corresponding relationship with a TTI type, whether the present logical channel allows transmission with the long TTI or not and whether the present logical channel allows transmission with the short TTI or not are checked. If the media access control layer finds that there are presently both a logical channel allowing transmission with the short TTI (a logical channel with data) and a logical channel allowing transmission with the long TTI (a logical channel with data), the terminal device generates the indication information in the media access control layer and transmits the indication information to the physical layer. The indication information is to instruct the terminal device to sense the resource pool with the short TTI and the resource pool with the long TTI at the physical layer.

In the implementation of the disclosure, the terminal device selectively senses the resource pool with the long TTI and the resource pool with the short TTI, so that data transmission efficiency may be effectively improved, and a data transmission delay may be reduced, thereby improving user experience.

A method adopted by the terminal device for sensing the resource pool in the physical layer in the implementation of the disclosure will be described below.

In the implementation of the disclosure, the media access control layer of the terminal device may further notify the physical layer of a required resource size (the number of subchannels) through the indication information, and the physical layer may implement sensing according to such a resource requirement. For example, implementation of long TTI sensing and a required resource size (the number of subchannels) for long TTI sensing are told. For another example, implementation of short TTI sensing and a required resource size (the number of subchannels) for short TTI sensing are told.

FIG. 4 illustrates a schematic flowchart of a resource pool sensing method for a terminal device according to an implementation of the disclosure.

As illustrated in FIG. 4, there is made such a hypothesis that each carrier corresponds to at least one SL process. For example, in 3GPP Rel-14, a carrier corresponds to two SL processes. When a new data packet arrives at a moment n, the terminal device is required to select a resource, and the terminal device may perform resource selection within an interval [n+T1, n+T2] according to a sensing result of a period of time in the past (for example, 1 second). Herein, T1≤4 ms and 20 ms≤T2≤100 ms.

It is to be understood that the ranges of T1 and T2 are only examples and should not limit the implementation.

A service in the internet of vehicles system is periodic. Therefore, in the implementation of the disclosure, the terminal device may adopt a semi-persistent transmission manner.

When the terminal device selects a resource for transmission, the terminal device may keep the resource used and reserved for Cresel times. Every time when data is transmitted, Cresel is decreased by 1. When Cresel is decreased to 0, the terminal device may randomly generate a random number in [0, 1] and compares the random number with a parameter (probResourceKeep). When the random number is greater than the parameter, the terminal device performs resource reselection. When the random number is less than the parameter, the terminal device keeps using the resource and resets Cresel.

In other words, the terminal device of the implementation of the disclosure may carry information of reserving a resource for next transmission in control information transmitted this time such that another terminal device may detect the control information of the terminal device to determine whether the resource is reserved and used by the terminal device, which can reduce resource conflicts. In other words, according to the implementation of the disclosure, after selecting a transmission resource, the terminal device may keep using the transmission resource in multiple transmission periods, thereby reducing the probabilities of resource reselection and resource conflicts.

Figure 5:
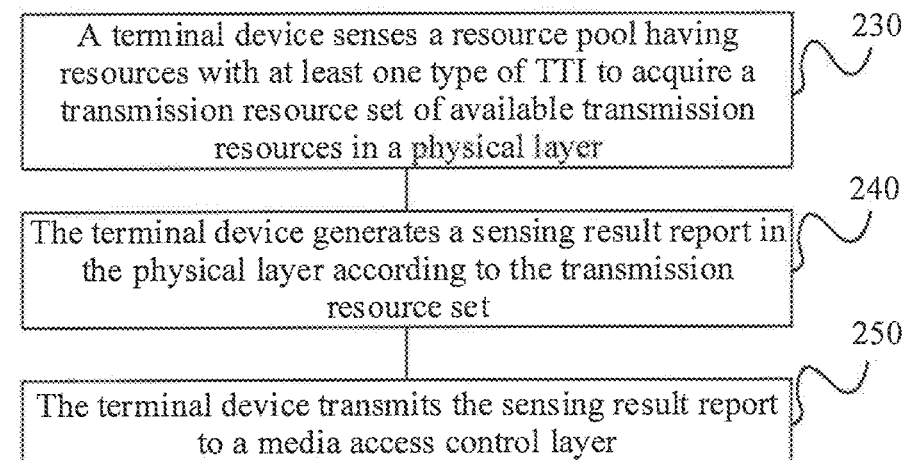
FIG. 5 illustrates a schematic flowchart of a sensing result report transmission method according to an implementation of the disclosure.

FIG. 5 illustrates a schematic flowchart of a sensing result report transmission method according to an implementation of the disclosure.

As illustrated in FIG. 5, the method includes the following operations.

At block 230, the terminal device senses a resource pool having resources with at least one type of TTI to acquire a transmission resource set of available transmission resources in the physical layer.

At block 240, the terminal device generates a sensing result report in the physical layer according to the transmission resource set.

At block 250, the terminal device sends the sensing result report to the media access control layer.

The terminal device senses in the physical layer, the resource pool having resources with the at least one type of TTI indicated in the indication information to acquire all available resources. These available resources may form a transmission resource set. Then, the terminal device generates the sensing result report in the physical layer according to the transmission resource set and transmits the sensing result report to the media access control layer.

According to the implementations of the disclosure, the terminal device is intended to acquire a first resource for transmitting data to be transmitted in the media access control layer. The terminal device may acquire all the available resources, i.e., the transmission resource set, by sensing in the physical layer. Therefore, in the implementation of the disclosure, the terminal device is required to execute an exclusion operation on the resources in the transmission resource set.

Optionally, the terminal device may directly transmit the transmission resource set to the media access control layer such that the media access control layer selects from the transmission resource set the first resource for transmitting the data to be transmitted.

Optionally, the terminal device, after acquiring the transmission resource set in the physical layer, may select part of resources from the transmission resource set at first and then transmit the selected part of resources to the media access control layer. The terminal selects the first resource for sending the data to be transmitted from the selected part of resources in the media access control layer.

That is, the sensing result report generated by the terminal device based on the transmission resource set in the physical layer may include all the resources in the transmission resource set and may also include part of resources in the transmission resource set.

Implementations of the operation that the terminal device generates the sensing result report in the physical layer will be described below respectively.

As an implementation, the sensing result report may include the transmission resource set.

After receiving the sensing result report in the media access control layer, the terminal device may select the first resource from the transmission resource set in the media access control layer and transmit the data to be transmitted on the first resource.

In other words, the terminal device does not perform resource selection in the physical layer and performs resource selection in the media access control layer.

As another implementation, the terminal device selects at least one resource from the transmission resource set in the physical layer and generates the sensing result report in the physical layer. The sensing result report includes the at least one resource.

In other words, the terminal device may select part of the available resources in the physical layer and transmit the selected part of the available resources to the media access control layer for use. Optionally, the physical layer selects and transmits a number of resources to the media access control layer, for example, at least 20% of the total available resources.

Optionally, before selecting the at least one resource from the transmission resource set in the physical layer, the terminal device acquires information about channel quality corresponding to each resource in the transmission resource set in the physical layer. The terminal device selects, based on the information about the channel quality corresponding to each resource in the transmission resource set, at least one resource from the transmission resource set in a descending order of channel quality in the physical layer.

In the implementations of the disclosure, the terminal device may acquire the information about the channel quality corresponding to each resource in the transmission resource set according to channel quality (for example, receiving power or receiving quality) of a physical sidelink shared channel (PSSCH) corresponding to a physical sidelink control channel (PSCCH) detected in a sensing window. The terminal device may also detect RSSIs of resources in the transmission resource set to acquire the information about the channel quality corresponding to each resource in the transmission resource set.

Optionally, when the transmission resource set includes resources with multiple types of TTIs, the terminal device selects a resource with a first type of TTI from the resources with the multiple types of TTIs in the physical layer. The terminal device determines the resource with the first type of TTI as the at least one resource in the physical layer.

Before selecting the resource with the first type of TTI from the resources with the multiple types of TTIs in the physical layer, the terminal device acquires the information about the channel quality corresponding to each resource with a respective type of TTI in the multiple types of TTIs. The terminal device selects the resource with the first type of TTI from the resources with the multiple TTIs in the physical layer according to the information about the channel quality corresponding to the resource with the respective type of TTI in the multiple types of TTIs.

The terminal device may determine the TTI type to which the resource with the highest channel quality belongs as the first type of TTI in the physical layer. Therefore, the data transmission reliability may be effectively improved, and the user experience is further improved.

For example, there is made such a hypothesis that the transmission resource set includes a resource with the short TTI and a resource with the long TTI. The terminal device may select a TTI type to select the at least one resource. For example, the terminal device selects the resource with the short TTI or the resource with the long TTI as the at least one resource.

The terminal device may acquire information about channel quality corresponding to the resource with the short TTI and information about channel quality corresponding to the resource with the long TTI at first and then determine the resource with the first type of TTI, i.e., the at least one resource, in the transmission resource set in the implementation of the disclosure according to the information about the channel quality corresponding to the resource with the short TTI and the information about the channel quality corresponding to the resource with the long TTI. It can be understood that, in the implementations of the disclosure, information about channel quality corresponding to a resource with a type of TTI may be a piece of information (for example, a threshold), namely the quality of the resource corresponding to the type of TTI may be reflected by the information.

For example, if the resource with the short TTI corresponds to a first threshold and the resource with the long TTI corresponds to a second threshold, the terminal device may compare the first threshold with the second threshold to determine the resource with the first type of TTI, i.e., the at least one resource, in the implementation of the disclosure.

It is to be understood that the operation that the terminal device selects the resource with the first type of TTI from the resources with the multiple types of TTIs in the physical layer according to the channel quality is only described as an example of selecting the resource of the first type of TTI and not intended to limit the implementation of the disclosure.

For example, the indication information in the implementations of the disclosure may further indicate a delay requirement of the data to be transmitted of the terminal device. The terminal device may select the resource with the first type of TTI from the resources with the multiple types of TTIs in the physical layer according to the delay requirement of the data to be transmitted. For example, for a service with a relatively high delay requirement, a resource with a short TTI may be used.

Accordingly, the data to be transmitted may be effectively matched with the resource type of the TTI, and the user experience is further improved. For example, for a service with a relatively high delay requirement, a resource with a short TTI may be used.

It is also to be understood that the resource with the first type of TTI in the implementation of the disclosure may be a resource with one type of TTI and may also be resources with multiple types of TTIs. In addition, in the implementations of the disclosure, the terminal device, when selecting the at least one resource from the transmission resource set in the physical layer, may directly select the at least one resource and may also select the at least one resource in an exclusion manner. There are no specific limits made in the implementations of the disclosure.

For example, the terminal device, when selecting the at least one resource, may exclude a resource conflicting with a next transmission resource reserved through control information of another terminal device.

For example, if there is no sensing result in some time units (for example, subframes) in the sensing window, the terminal device may exclude resources in time units corresponding to the time units, in a selection window.

For another example, for effectively reducing a workload of the terminal device and further improving processing efficiency, the terminal device may randomly select the at least one resource from the transmission resource set in the physical layer.

Figure 6:
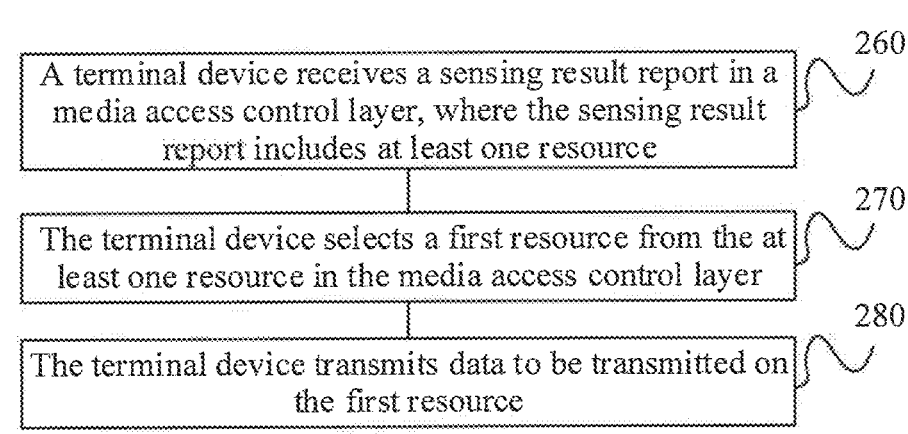
FIG. 6 illustrates a schematic flowchart of a method for transmitting data to be transmitted according to an implementation of the disclosure.

FIG. 6 illustrates a schematic flowchart of a method for transmitting data to be transmitted according to an implementation of the disclosure.

As illustrated in FIG. 6, the method includes the following operations.

At block 260, the terminal device receives a sensing result report in the media access control layer, where the sensing result report includes at least one resource.

At block 270, the terminal device selects a first resource from the at least one resource in the media access control layer.

At block 280, the terminal device transmits the data to be transmitted on the first resource.

It is to be understood that, in the implementation of the disclosure, the terminal device, when selecting the first resource from the at least one resource in the media access control layer, may randomly select the first resource and may also select the first resource according to a rule. There are no specific limits made in the implementation of the disclosure.

For example, the terminal device may select the first resource from the at least one resource in a descending order of channel quality in the media access control layer.

For another example, the terminal device may select resources with a type of TTI at first and then select the first resource from the resources with the TTI of this type in the media access control layer.

For another example, for effectively reducing the workload of the terminal device and further improving the processing efficiency, the terminal device may randomly select the first resource from the transmission resource set in the media access control layer.

It is to be noted that, in the implementation of the disclosure, the terminal device may be required to perform resource selection in the media access control layer no matter whether the terminal device performs resource selection in the physical layer or not.

Therefore, the terminal device can select a relatively good resource in the media access control layer.

Optionally, the resources in the sensing result report may be ranked in a descending or ascending order of channel quality. Therefore, the terminal device may select the first resource for transmitting the data to be transmitted in the media access control layer according to the order of the resources in the sensing result report.

Optionally, the sensing result report may further include the information about the channel quality corresponding to each resource in the sensing result report. The information about the channel quality includes at least one piece of the following information: an RSSI, RSRP, or RSRQ. Therefore, the terminal device may select the first resource for transmitting the data to be transmitted in the media access control layer according to the information about the channel quality corresponding to each resource in the sensing result report.

Optionally, the sensing result report further includes the information about the channel quality corresponding to each resource with a respective type of TTI in the sensing result report. Therefore, the terminal device may select resources with a second type of TTI based on the information about the channel quality corresponding to the resource with the respective TTI in the sensing result report and then select the first resource for transmitting the data to be transmitted from the resources with the second type of TTI.

It is to be understood that, in the implementation of the disclosure, since the sensing result report may include the information about the channel quality corresponding to each resource with a respective TTI in the sensing result report, a manner in which the terminal device selects the resource with the second type of TTI in the media access control layer may be the same as or different from the implementation manner for the operation that the terminal device selects the resource with the first type of TTI. There are no specific limits made in the implementation of the disclosure. For avoiding repetitions, elaborations are omitted herein.

Figure 7:
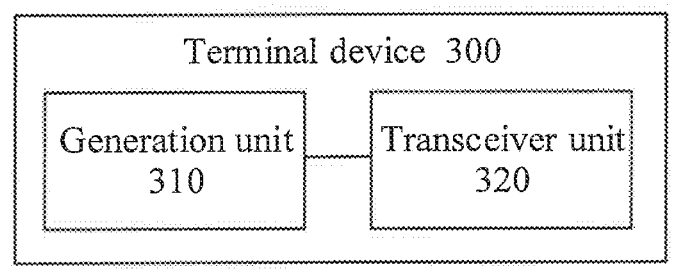
FIG. 7 illustrates a schematic block diagram of a terminal device according to an implementation of the disclosure.

FIG. 7 illustrates a schematic block diagram of a terminal device 300 according to an implementation of the disclosure.

As illustrated in FIG. 7, the terminal device 300 includes a generation unit 310 and a transceiver unit 320.

The generation unit 310 is configured to generate indication information in a media access control layer, where the indication information is to instruct the terminal device to sense a resource pool having resources with at least one type of TTI in a physical layer.

The transceiver unit 320 is configured to transmit the indication information to the physical layer.

Optionally, the generation unit 310 may be specifically configured to:

before generating the indication information in the media access control layer, acquire correspondence relationship information, where the correspondence relationship information includes correspondences between logical channels for transmitting data to be transmitted and the at least one TTI supported by the logical channels, and generate the indication information in the media access control layer according to the correspondence relationship information.

Optionally, the generation unit 310 may be further configured to:

sense the resource pool with the at least one type of TTI to acquire a transmission set of available transmission resources in the physical layer and generate a sensing result report in the physical layer according to the transmission resource set.

The transceiver unit 320 may be further configured to transmit the sensing result report to the media access control layer.

Optionally, the sensing result report includes the transmission resource set.

Optionally, the transceiver unit 320 may be further configured to:

receive the sensing result report in the media access control layer, where the sensing result report includes the transmission resource set; select a first resource from the transmission resource set in the media access control layer; and transmit the data to be transmitted on the first resource.

Optionally, the generation unit 310 may be specifically configured to:

select at least one resource from the transmission resource set in the physical layer and generate the sensing result report in the physical layer, where the sensing result report includes the at least one resource.

Optionally, the generation unit 310 may be further specifically configured to:

acquire information about channel quality corresponding to each resource in the transmission resource set in the physical layer and select, based on the information about the channel quality corresponding to each resource in the transmission resource set, the at least one resource from the transmission resource set in a descending order of channel quality in the physical layer.

Optionally, the generation unit 310 may be further specifically configured to:

in a case that the transmission resource set includes resources with multiple types of TTIs, select a resource with a first type of TTI from the resources with the multiple types of TTIs in the physical layer and determine the resource with the first type of TTI as the at least one resource in the physical layer.

Optionally, the generation unit 310 may be further specifically configured to:

before selecting the resource with the first type of TTI from the resources with the multiple types of TTIs in the physical layer, acquire, by the terminal device, information about channel quality corresponding to each resource in the transmission resource set in the physical layer and randomly select, based on the information about channel quality corresponding to each resource in the transmission resource set, the resource with the first type of TTI from the resources with the multiple types of TTIs in a descending order of channel quality in the physical layer.

Optionally, the transceiver unit 320 may be further configured to:

receive the sensing result report in the media access control layer, where the sensing result report includes the at least one resource, select the first resource from the at least one resource in the media access control layer and transmit the data to be transmitted on the first resource.

Optionally, the transceiver unit 320 may be specifically configured to:

randomly select the first resource from the at least one resource in the media access control layer.

Optionally, the transceiver unit 320 is further configured to:

select the first resource from the at least one resource in the media access control layer in a descending order of channel quality.

Optionally, the resources in the sensing result report are ranked in a descending or ascending order of channel quality.

Optionally, the sensing result report further includes the information about channel quality corresponding to each resource in the sensing result report, and the information about the channel quality includes at least one piece of the following information: an RSSI, RSRP, or RSRQ; or the sensing result report further includes the information about the channel quality corresponding to each resource with a respective type of TTI in the sensing result report.

Optionally, the at least one type of TTI includes at least one of a first type of TTI or a second type of TTI, and a length of the first type of TTI is greater than a length of the second type of TTI.

Optionally, the length of the first type of TTI is 1 ms, and the length of the second type of TTI is 0.5 ms.

Figure 8:
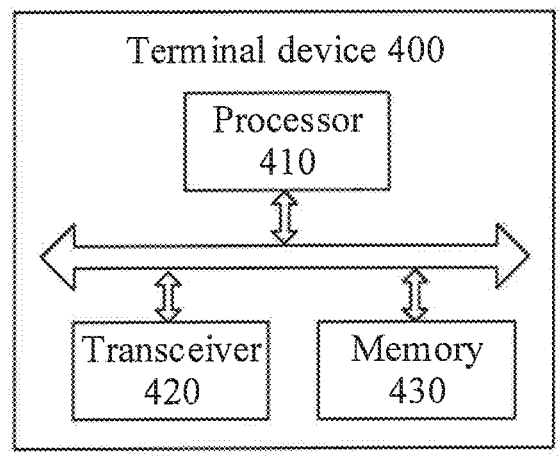
FIG. 8 illustrates a schematic block diagram of another terminal device according to an implementation of the disclosure.

It is to be noted that, in the implementation of the disclosure, the generation unit 310 may be implemented by a processor and the transceiver unit 320 may be implemented by a transceiver. As illustrated in FIG. 8, a terminal device 400 may include a processor 410, a transceiver 420 and a memory 430. The memory 430 may be configured to store indication information and may further be configured to store a code, instructions and the like executed by the processor 410. Each component in the terminal device 400 is connected through a bus system. The bus system includes a data bus, and further includes a power bus, a control bus and a state signal bus.

The terminal device 700 illustrated in FIG. 8 may implement each process implemented by a terminal device in the method implementation of FIG. 3 to FIG. 6. For avoiding repetitions, elaborations are omitted herein.

That is, the method in the implementations of the disclosure may be applied to a processor or implemented by the processor. The processor may be an integrated circuit chip with a signal processing capability. In an implementation process, each step of the method implementation may be completed by an integrated logical circuit of hardware in the processor or an instruction in a software form. The processor may be a universal processor, a digital signal processor (DSP), an application specific integrated circuit (ASIC), a field programmable gate array (FPGA) or another programmable logical device, transistor logical device and discrete hardware component. Each method, step and logical block diagram disclosed in the implementations of the disclosure may be implemented or executed. The universal processor may be a microprocessor or the processor may also be any conventional processor and the like. The steps of the method disclosed in combination with the implementations of the disclosure may be directly embodied to be executed and completed by a hardware decoding processor or executed and completed by a combination of hardware and software modules in the decoding processor. The software module may be located in a mature storage medium in this field such as a random access memory (RAM), a flash memory, a read-only memory (ROM), a programmable ROM (PROM) or electrically erasable PROM (EEPROM) and a register. The storage medium is located in a memory, and the processor reads information in the memory, and completes the steps of the methods in combination with hardware.

It can be understood that the memory in the implementation of the disclosure may be a volatile memory or a nonvolatile memory, or may include both the volatile and nonvolatile memories. The nonvolatile memory may be a ROM, a PROM, an erasable PROM (EPROM), an EEPROM or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DR RAM). It is to be noted that the memory of a system and method described in the disclosure is intended to include, but not limited to, memories of these and any other proper types.

It is finally to be noted that terms used in the implementations and appended claims of the disclosure are only for the purpose of describing the specific implementations and not intended to limit the implementations of the disclosure.

For example, singular forms "a/an", "said" and "the" used in the implementations and appended claims of the disclosure are also intended to include plural forms unless other meanings are clearly expressed in the context.

For another example, terms first-type cell group and second-type cell group may be adopted in the implementations of the disclosure, but cell groups of these types should not be limited to these terms. The terms are only adopted to distinguish various types of cell groups.

For another example, based on the context, term "while" used here may be explained as "if" or "in case of" or "when" or "responsive to determining" or "responsive to detecting". Similarly, based on the context, phrase "if determining" or "if detecting (stated condition or event)" may be explained as "when determining" or "responsive to determining" or "when detecting (stated condition or event)" or "responsive to detecting (stated condition or event)".

Those of ordinary skill in the art may realize that the units and algorithm steps of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the implementations of the disclosure.

Those skilled in the art may clearly learn about that specific working processes of the system, device and unit described above may refer to the corresponding processes in the method and will not be elaborated herein for convenient and brief description.

In some implementations provided by the application, it is to be understood that the disclosed system, device and method may be implemented in another manner. For example, the device implementation described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the implementations of the disclosure according to a practical requirement.

In addition, each function unit in the implementations of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the implementations of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in the implementations of the disclosure. The abovementioned storage medium includes: various media capable of storing program codes such as a U disk, a mobile hard disk, a ROM, a RAM, a magnetic disk or an optical disk.

The above is only the specific implementations of the disclosure and not intended to limit the scope of protection of the implementations of the disclosure. Any variations or replacements apparent to those skilled in the art within the technical scope disclosed by the implementations of the disclosure shall fall within the scope of protection of the implementations of the disclosure. Therefore, the scope of protection of the implementations of the disclosure shall be subject to the scope of protection of the claims.

The invention claimed is:

1. A sensing method, comprising:
generating, by a terminal device, indication information in a media access control layer, wherein the indication information is to instruct the terminal device to sense a resource pool having resources with at least one type of transmission time interval (TTI) in a physical layer;
transmitting, by the terminal device, the indication information to the physical layer;
sensing, by the terminal device, the resource pool having resources with the at least one type of TTI to acquire a transmission resource set of available transmission resources in the physical layer;
generating, by the terminal device, a sensing result report in the physical layer according to the transmission resource set; and
transmitting, by the terminal device, the sensing result report to the media access control layer, wherein the sensing result report comprises the transmission resource set.

2. The sensing method of claim 1, further comprising:
before generating, by the terminal device, the indication information in the media access control layer,
acquiring, by the terminal device, correspondence relationship information in the media access control layer, wherein the correspondence relationship information comprises correspondences between logical channels for transmitting data to be transmitted and the at least one type of TTI supported by the logical channels,
wherein generating, by the terminal device, the indication information in the media access control layer comprises:
generating, by the terminal device, the indication information in the media access control layer according to the correspondence relationship information.

3. The sensing method of claim 1, further comprising:
receiving, by the terminal device, the sensing result report in the media access control layer, wherein the sensing result report comprises the transmission resource set;
selecting, by the terminal device, a first resource from the transmission resource set in the media access control layer; and
transmitting, by the terminal device, data to be transmitted on the first resource.

4. The sensing method of claim 1, wherein
resources in the sensing result report are ranked in a descending or ascending order of channel quality.

5. The sensing method of claim 1, wherein
the sensing result report further comprises information about channel quality corresponding to each resource in the sensing result report, wherein the information about the channel quality corresponding to each resource comprises at least one piece of the following information: a receive signal strength indicator (RSSI), reference signal receiving power (RSRP), or reference signal receiving quality (RSRQ); or, the sensing result report further comprises information about channel quality corresponding to each resource with a respective type of TTI in the sensing result report.

6. The sensing method of claim 1, wherein
the at least one type of TTI comprises at least one of a first type of TTI or a second type of TTI, wherein a length of the first type of TTI is greater than a length of the second type of TTI.

7. A sensing method, comprising:
generating, by a terminal device, indication information in a media access control layer, wherein the indication information is to instruct the terminal device to sense a resource pool having resources with at least one type of transmission time interval (TTI) in a physical layer;
transmitting, by the terminal device, the indication information to the physical layer;
sensing, by the terminal device, the resource pool having resources with the at least one type of TTI to acquire a transmission resource set of available transmission resources in the physical layer;
generating, by the terminal device, a sensing result report in the physical layer according to the transmission resource set; and
transmitting, by the terminal device, the sensing result report to the media access control layer, wherein the sensing result report comprises the transmission resource set,
wherein generating, by the terminal device, the sensing result report in the physical layer according to the transmission resource set comprises:
selecting, by the terminal device, at least one resource from the transmission resource set in the physical layer; and
generating, by the terminal device, the sensing result report in the physical layer, wherein the sensing result report comprises the at least one resource.

8. The sensing method of claim 7, further comprising:
before selecting, by the terminal device, the at least one resource from the transmission resource set in the physical layer,
acquiring, by the terminal device, information about channel quality corresponding to each resource in the transmission resource set in the physical layer,
wherein selecting, by the terminal device, the at least one resource from the transmission resource set in the physical layer comprises:
selecting, by the terminal device, based on the information about the channel quality corresponding to each resource in the transmission resource set, the at least one resource from the transmission resource set in a descending order of channel quality in the physical layer.

9. The sensing method of claim 7, wherein selecting, by the terminal device, the at least one resource from the transmission resource set in the physical layer comprises:
in a case that the transmission resource set comprises resources with a plurality of types of TTIs, selecting, by the terminal device, a resource with a first type of TTI from the resources with the plurality of types of TTIs in the physical layer; and
determining, by the terminal device, the resource with the first type of TTI as the at least one resource in the physical layer.

10. The sensing method of claim 9, further comprising:
before selecting, by the terminal device, the resource with the first type of TTI from the resources with the plurality of types of TTIs in the physical layer,
acquiring, by the terminal device, information about channel quality corresponding to each resource with a respective type of TTI in the plurality of types of TTIs in the physical layer,
wherein selecting the resource with the first type of TTI from the resources with the plurality of types of TTIs comprises:
selecting, by the terminal device, based on the information about the channel quality corresponding to each resource with the respective type of TTI in the plurality of types of TTIs, the resource with the first type of TTI from the resources with the plurality of types of TTIs in the physical layer.

11. The sensing method of claim 7, further comprising:
receiving, by the terminal device, the sensing result report in the media access control layer, wherein the sensing result report comprises the at least one resource;
selecting, by the terminal device, a first resource from the at least one resource in the media access control layer; and
transmitting, by the terminal device, data to be transmitted on the first resource.

12. The sensing method of claim 11, wherein selecting, by the terminal device, the first resource from the at least one resource in the media access control layer comprises:
randomly selecting, by the terminal device, the first resource from the at least one resource in the media access control layer; or,
selecting, by the terminal device, the first resource from the at least one resource in a descending order of channel quality in the media access control layer.

13. A terminal device, comprising:
a processor, configured to generate indication information in a media access control layer, wherein the indication information is to instruct the terminal device to sense a resource pool having resources with at least one type of transmission time interval (TTI) in a physical layer; and
a transceiver, configured to transmit the indication information to the physical layer;
wherein the processor is further configured to:
sense the resource pool having resources with the at least one type of TTI to acquire a transmission resource set of available transmission resources in the physical layer; and
generate a sensing result report in the physical layer according to the transmission resource set; and the transceiver is further configured to:
transmit the sensing result report to the media access control layer, wherein the sensing result report comprises the transmission resource set.

14. The terminal device of claim 13, wherein the processor is specifically configured to:
before generating the indication information in the media access control layer, acquire correspondence relationship information, wherein the correspondence relationship information comprises correspondences between logical channels for transmitting data to be transmitted and the at least one type of TTI supported by the logical channels; and
generate the indication information in the media access control layer according to the correspondence relationship information.

15. The terminal device of claim 13, wherein the transceiver is further configured to:
receive the sensing result report in the media access control layer, wherein the sensing result report comprises the transmission resource set;
select a first resource from the transmission resource set in the media access control layer; and
transmit data to be transmitted on the first resource.

16. The terminal device of claim 13, wherein the processor is specifically configured to:
select at least one resource from the transmission resource set in the physical layer; and
generate the sensing result report in the physical layer, wherein the sensing result report comprises the at least one resource.

17. The terminal device of claim 16, wherein the processor is further specifically configured to:
acquire information about channel quality corresponding to each resource in the transmission resource set in the physical layer; and
select, based on the information about the channel quality corresponding to each resource in the transmission resource set, the at least one resource from the transmission resource set in a descending order of channel quality in the physical layer.

18. The terminal device of claim 16, wherein the transceiver is further configured to:
receive the sensing result report in the media access control layer, wherein the sensing result report comprises the at least one resource;
select a first resource from the at least one resource in the media access control layer; and
transmit the data to be transmitted on the first resource.

* * * * *